(12) United States Patent
Yukio et al.

(10) Patent No.: US 6,379,735 B1
(45) Date of Patent: Apr. 30, 2002

(54) METHOD OF SUGAR-LIKE FLAVOROUS COMPONENT AND METHOD OF PREPARATION OF PERFUMERY COMPOSITION OR BEVERAGE USING THE RESULTING FLAVOROUS COMPONENT

(75) Inventors: Goto Yukio; Nagano Katsumi, both of Hiratsuka (JP)

(73) Assignee: Takasago International Corporation, Hiratsuka (JP)

( * ) Notice: Subject to any disclaimer, the term of this patent is extended or adjusted under 35 U.S.C. 154(b) by 0 days.

(21) Appl. No.: 09/618,639

(22) Filed: Jul. 18, 2000

(30) Foreign Application Priority Data

Jul. 19, 1999 (JP) ............................. 11-204652

(51) Int. Cl.7 ................................. A23L 1/22
(52) U.S. Cl. ...................... 426/534; 426/425; 426/429; 426/590; 426/650
(58) Field of Search ................. 426/534, 590, 426/650, 658, 425, 429

(56) References Cited

U.S. PATENT DOCUMENTS 4,995,945 A 2/1991 Craig ......................... 202/177

FOREIGN PATENT DOCUMENTS

WO 90/02493 3/1990

OTHER PUBLICATIONS

Craig, A., AN 88(03):H003 FSTA, abstracting Food Technology in Australia, 1987, 39(3) 102–104.*

S. J. Sykes et al., "The Design of Spinning Cone Distillation Columns", Icheme Symposium Series No. 128, pp. A167–A179, No date.

A. J. Wright et al., "An Investigation into the Use of the Spinning Cone Column for in situ Ethanol Removal from a Yeast Broth", 1996 Process Biochemistry, vol. 31, No. 7, pp. 651–658.

T. Schofield et al., "Developments with the Spinning Cone Column to Extract Natural Concentrated Aromas", pp. 52–55.

* cited by examiner

Primary Examiner—Leslie Wong
(74) Attorney, Agent, or Firm—Morgan, Lewis & Bockius LLP

(57) ABSTRACT

The invention has an object of providing a method of the preparation of a sugar-like flavorous component which imparts a mellow feeling to beverages and flavorous compositions and retains a live flavor even if it is diluted thousands times. The method of the preparation of a sugar-like flavorous component includes steps of adding 1.5 to 3 parts by weight of ion exchange water and 0.02 to 0.05 parts by weight of ethanol to 1 part by weight of molasses in a feed tank, mixing and dissolving these components thoroughly with stirring, and introducing the resulting solution into a spinning cone column (SCC) to treat the solution in the following condition: the temperature in a column: 40 to 60° C., strip rate: 0.5 to 7% and the degree of pressure reduction: 70 to 100 kPa.

5 Claims, 3 Drawing Sheets

METHOD OF SUGAR-LIKE FLAVOROUS COMPONENT AND METHOD OF PREPARATION OF PERFUMERY COMPOSITION OR BEVERAGE USING THE RESULTING FLAVOROUS COMPONENT

BACKGROUND OF THE INVENTION

1. Field of the Invention

The present invention relates to a method of preparing a sugar-like flavorous component by specific treatment using molasses as starting material and to a method of preparing a perfumery composition or a beverage by adding the resulting sugar-like flavorous component.

2. Description of the Related Art

With regard to the flavor of molasses, the flavorous component is conventionally prepared by extraction using organic solvents. The resulting extract has a caramel-like form, an intensive color and a feature of a distinguished smell. No devised method of utilizing the flavorous component of the molasses has been found.

The separation of flavorous substances by using a spinning cone column (hereinafter simply referred to as "SCC") used in the process of the present invention and mass-transfer equipment are explained in "1st Conference of Food Engineering, 1991, AIChE, Chicago, Ill.". Also, it is disclosed in the specification of WO90/02493 that vegetables and fruits such as tomatoes, apples and pears are processed using the SCC to obtain a high viscosity component having a low flavor. There are detailed descriptions concerning the design of a column of the SCC in "I. Chem. E. Symp. Series, A128, 167–179, 1992". The SCC is also used in a process of the recovery of volatile components such as flavors wherein a volatile component (ethanol) is recovered at lower temperatures from a culture solution of fermented yeast (see Process Biochemistry, Vol. 31, No. 7, pp.651–658, 1995).

A spinning cone column and a method of removing volatile components from a solution are disclosed in JP-B-7-22646. There is a report that in the recovery of the flavorous components of apples and red berry fruits, the level of the content of free and combined sulfurous acid is lowered to 5 ppm or less (Food and Container, Vol. 39, No. 7, pp.406–408, 1988). In the recovery of flavorous components in Flavourtech (see the specification of U.S. Pat. No. 4,996,945), high recovery rates are obtained in the processing of beer flavors, apples, oranges, grapes, apricots or strawberries flavors.

SUMMARY OF THE INVENTION

When flavorous components are extracted using an organic solvent like in the conventional method, even a dye of molasses is extracted and contained in the extract, which eventually exhibits a caramel-like color. Because of this unacceptable caramel-like color, the extract is only used for products which demand no special care to the color. Also the conventional method has the problem that water-soluble low molecular weight components can be extracted only insufficiently. The present invention provides a method of the preparation of an isolated sugar-like flavorous component which is added to beverages or flavorous compositions to impart a mellow feeling and natural flavor to the compound products and produces a sensible flavor even if it is diluted thousands times.

The inventors of the present invention have made earnest studies to solve the aforementioned problems and, as a result, not only a recovery flavor is simply recovered but also a flavorous component which solves the above problem can be obtained by making good use of the aforementioned SCC. Specifically, 1.5 to 3 parts by weight of ion exchange water and 0.02 to 0.05 parts by weight of ethanol are added to 1 part by weight of molasses, which is dissolved under heat to regulate the viscosity, in a feed tank and these components are thoroughly mixed and dissolved with stirring. The resulting solution is introduced into the spinning cone column (SCC) and treated for 1 to 3 minutes in the following condition: the temperature in a column: 40 to 60° C., strip rate: 0.5 to 7% and the degree of pressure reduction: 70 to 100 kPa, whereby the objective sugar-like flavorous component can be prepared.

According to a first aspect of the present invention, there is provided:

(1) a method of the preparation of a sugar-like flavorous component, the method comprising steps of;
  adding 1.5 to 3 parts by weight of ion exchange water and 0.02 to 0.05 parts by weight of ethanol to 1 part by weight of molasses in a feed tank;
  mixing and dissolving these components thoroughly with stirring; and
  introducing the resulting solution into a spinning cone column (SCC) to treat the solution in the following condition: the temperature in a column: 40 to 60° C., strip rate: 0.5 to 7% and the degree of pressure reduction: 70 to 100 kPa.

(2) In a method of the preparation of a sugar-like flavorous component according to the invention (1), preferably the strip rate is 0.5 to 3% and the sugar-like flavor is highly refined sugar-like flavor.

(3) In a method of the preparation of a sugar-like flavorous component according to the invention (1), preferably the strip rate is 3 to 7% and the sugar-like flavor is unrefined sugar-like flavor.

According to a second aspect of the present invention, there is provided:

(4) a method of the preparation of a flavorous composition, the method comprising adding the sugar-like flavor component obtained by the method as claimed in any one of the above (1) to (3) to a perfumery in an amount of 5 to 30% by weight.

According to a third aspect of the present invention, there is provided:

(5) a method of the preparation of a beverage, the method comprising adding the sugar-like flavor component obtained by the method as claimed in any one of the above (1) to (3) to a beverage in an amount of 0.01 to 5% by weight.

DETAILED DESCRIPTION OF THE INVENTION

Figure 1:
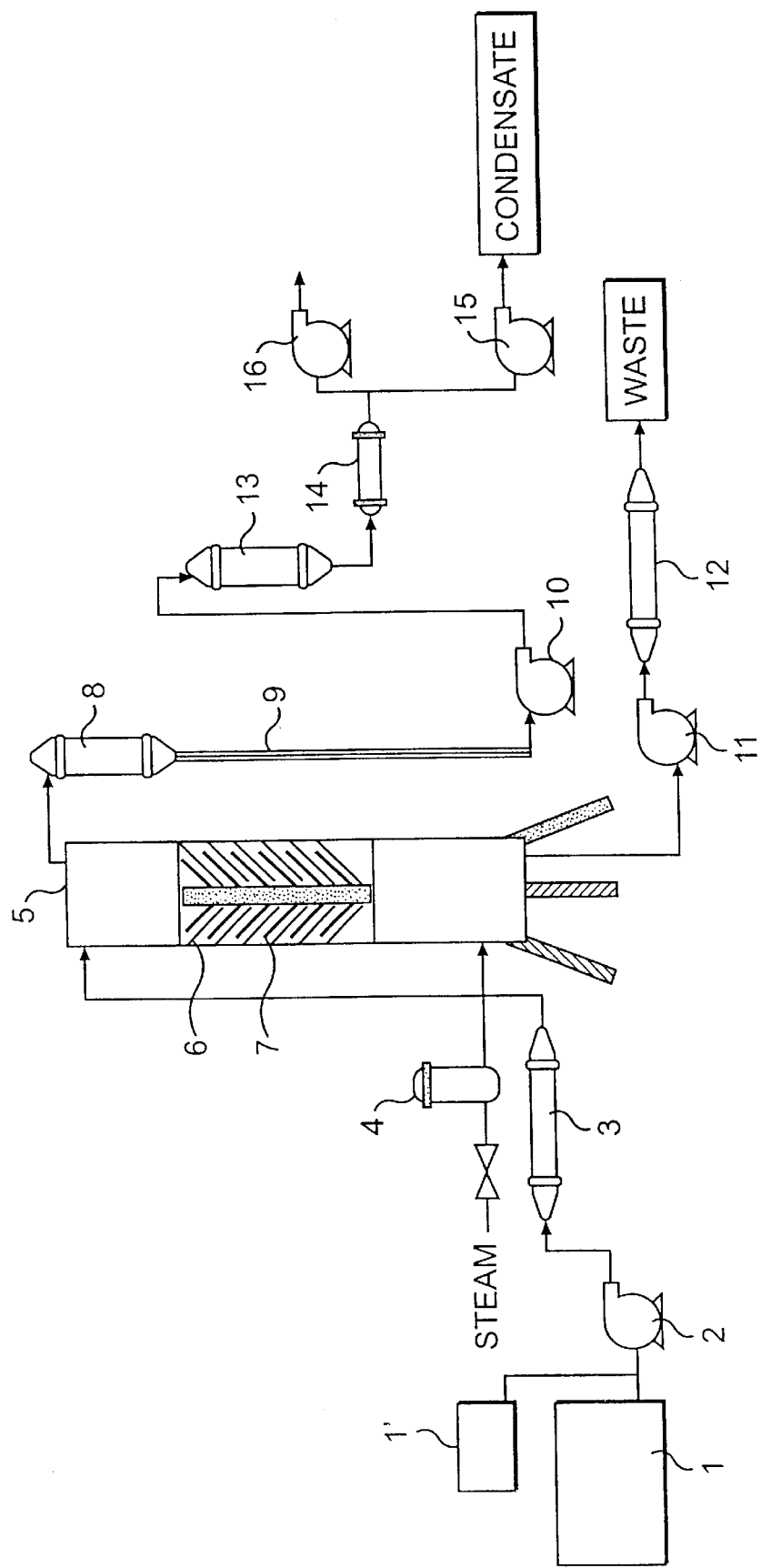
FIG. 1 is a schematic view of an spinning cone column (SCC)

The present invention will be hereinafter explained in more detail.

The raw material, namely, molasses is a by-product in the production of sugar, the production center of imported raw sugar is diversified and the manufacturing place comprises various places. However, as the molasses, those which are used as the usual foods and have a Brix (the content of soluble solids) of about 75 may be all utilized. The viscosity of molasses in the preparation in relation to its concentration is 20 to 60 mPa·s, preferably 40 to 55 mPa·s and more preferably 54 mPa·s in view of its operability. A viscosity exceeding 60 mPa·s results in difficult feed because of a systemic limitation. So the feed solution is adjusted to a viscosity lower than 60 mPa·s.

The amount of ion exchange water to be added is 1.5 to 3 parts by weight and preferably 1 to 2 parts by weight based on 1 part by weight of molasses. As the ion exchange water, for example, water which is obtained by treating city water by using an ion exchange resin (e.g., porous resins such as a negative ion exchange resin: RGA416 (manufactured by Mitsubishi Chemical) and a positive ion exchange resin: SK1B (manufactured by Mitsubishi Chemical)) and which has an electroconductivity of 2 $\mu$S/cm or less as one of the water qualities thereof. The amount of ethanol is 0.02 to 0.05 parts by weight and preferably 0.02 to 0.04 parts by weight based on 1 part by weight of molasses.

As to the strip rate, the maximum strip rate is 10% and the minimum strip rate can be 0.001% if restripping is carried out in a usual operation based on the design of the equipment. In the case of the present invention, the strip rate is 0.5 to 7% and preferably 2 to 6% to obtain a desired flavor of molasses. The resultant flavorous component has a highly refined sugar-like flavor when the strip rate is 0.5 to 3% and a highly refined sugar-like flavor when the strip rate is 3 to 7%.

It is necessary that the temperature in the column when the resulting solution is introduced into the SCC column is 40 to 60° C. A temperature exceeding 60° C. causes an offensive smell. The degree of pressure reduction must be 70 to 100 kPa and preferably 80 to 95 kPa. The degree of pressure reduction is changed according to the conditions such as the type of molasses, the amount of alcohol and strip rate. The process time, namely, the time during which the feed solution flows from the heater to the lower portion of the column body is about 1 to 4 minutes and preferably about 2 minutes. This time relates to the amount to be fed after the condition in the column reaches steady state, to the sprit ratio and to what levels are required as the concentration and amount of the feed.

Preferably the flavor of the resulting extract ranges from a highly refined sugar-like flavor to a unrefined sugar-like flavor. The content of alcohol contained in the resulting extract is 15 to 65% by weight and preferably 16 to 60% by weight. The specific gravity of the extract is 0.863 to 0.975 and the refractive index of the extract is 1.341 to 1.364.

The proportion of the sugar-like flavorous component, obtained by the aforementioned preparation method, in a perfumery is generally in such a range as not to spoil especially the characteristic smell. The sugar-like flavorous component may be added to a perfumery in an amount of 5 to 30% by weight. An excessive amount brings about a too conspicuous sugar-like flavor whereas excessively small amount gives no effect by addition. The amount of the sugar-like flavorous component, obtained by the aforementioned preparation method, to be added in a beverage is 0.01 to 5% by weight. An amount out of the above range makes it impossible to impart a natural flavor like the above. Examples of beverages on which an effect is brought about by applying the sugar-like flavorous component thereto include beverages such as coffee beverages (non-sugar or containing sugar), tea beverages (non-sugar or containing sugar), lactic beverages, fruit juice beverages, cocoa beverages, nutrient beverages, carbonated beverages (non-sugar or containing sugar), sports drinks (non-sugar or containing sugar), cola beverages and a light flavored water (non-sugar or containing sugar), alcoholic beverages such as cocktails, frozen sweets and deserts such as puddings, jellies, yogurts, sherbets, popsicles, gums, candies and tablets and baked sweets such as cookies.

The present invention ensures that a unique sugar-like flavorous component which can be applied to a wide range of products can be prepared. The flavorous component obtained in the present invention can impart a natural mellow feeling and sweet to products using artificial/natural sweeteners (excluding sugar) and can give profundity with a pleasant aftertaste to compound perfumeries and beverages. Especially, the astringent taste and bitter taste of tea or coffee, the acrid taste and astringent taste of inorganic salts such as sports drinks can be softened or masked. Moreover, compositions having an effect which cannot be predicted from molasses having a characteristic flavor and color can be prepared.

EXAMPLE

The present invention will be hereinafter explained in more detail by way of examples, which are not intended to be limiting of the present invention.

1. A spinning cone column (SCC), measuring instruments and measurement methods used in examples are as follows.
1) SCC: M1000, manufactured by Flavourtech, 300 mm (the inside diameter of the column)×3,700 mm (the height of the column).
2) Measurement of refractive index
   Precision Abbe's refractometer NAR-3T (ATAGO)
3) Measurement of the content of ethanol
   Gas chromatography
   Hewlett Packard HP 6890
   Column TC-WAX (GL Science) (30 m×0.25 mmID, 0.25 $\mu$mdf)
   Detector: TCD, temperature: from 50° C. (4 minutes) to 210° C., the rate of a rise in temperature: 10° C./minute
   Injection amount: 0.1 $\mu$l, sprit ratio: 100:1, injection temperature: 240° C., detection temperature: 240° C.
4) Analysis of components
   Gas chromatography
   Perkin-Elmer Autosystem GC
   Column BC-WAX (GL Science) (50 m×0.25 mmID, 0.25 $\mu$mdf)
   Detector: FID, temperature: from 50° C. (4 minutes) to 230° C., the rate of a rise in temperature: 4° C./minute
   Injection amount: 0.1 $\mu$l, sprit ratio: 80:1, injection temperature: 230° C., detection temperature: 230° C.
5) Measurement of the content of flavorous components
   Instrument: Perkin-Elmer Autosystem GC
   Equipment: see FIG. 3
   Operation method:
   300 g of a sample obtained according to the process flow of FIG. 2 was diluted and dissolved in 60 ml of pure water. Isoamyl isovalerate was added as the internal standard to the mixture in an amount of 1 ppm based on the sample. The resulting solution was poured into two columns each packed with 20 cc (5 g) of Bond Elute C-18 (manufactured by *BARIAN*) with a particle diameter of 40 $\mu$m. Thereafter, the column was washed with 80 ml of ion exchange water and a flavorous component was extracted using 80 ml of diethyl ether as a desorption solvent. The extract was dried by adding sodium sulfate anhydrous and then placed in a flask after sodium sulfate anhydride was removed. The extracted flavorous component was set on a Kuderna Danish (KD) concentrator shown in FIG. 3 and the flask (20) was heated to 40 to 45° C. in a water bath (21) in a nitrogen stream to distill the solvent (ether) which was rapidly cooled and collected in a conical flask (25) thereby obtaining a residue (including a flavorous component). This residual sample was analyzed by means of gas chromatography to calculate the content of the flavorous component from a relative value of each peak to that of the peak of the internal standard.

2. The method of the operation of the spinning cone column (SCC: M1000), the flow process of the start of the operation of the SCC and the regulations of column temperature and stripping ratio will be briefly explained with reference to FIG. 1 and FIG. 2.

Raw materials weighing in accordance with a desired amount to be produced are placed in an SCC feed tank (1) equipped with a stirrer and stirred sufficiently such that the raw materials are uniformed as a feed material. The feed material is sampled to measure the viscosity and the like.

Firstly, city water is allowed to flow from a city water tank (1') to the SCC column (5) to set up the condition required to recover a flavor. The feed amount, the outlet temperature of a heat exchanger and each temperature of the top and bottom of the column are set on an operation control panel. Next, the opening of a vacuum valve is regulated and each temperature of all portions (the top and bottom temperatures of the column) of the SCC column (5) is determined. The strip rate is determined by regulating the amount of steam supplied from a steam filter (4) to the column (5) to confirm whether or not a desired strip rate in accordance with the feed amount is obtained by measuring the amount of city water discharged from a second condenser (13) and discharged time. If the amount obtained by stripping accords with the set condition, city water is switched to the feed solution.

Specifically, the feed solution is allowed to flow from the SCC feed tank (1) of the SCC equipment to the SCC column (5) to set up the condition required to recover a flavor like the above case of city water. After a drainage of the feed is discharged from the outlet of the SCC column (5) and a solution containing a flavor begins to flow out via the second condenser (13) and a condensate-discharge pump 2 (15), the flow rate per hour is confirmed and the flavor of the discharged solution is confirmed (whether the strip rate is correct or not) by comparing with that of a standard sample and then the recovery of a flavor is started. At this time, the flavor of the drainage is confirmed. The feed amount, outlet temperature of a heat exchanger, each temperature of the top and bottom of the column, the degree of vacuum and the strip rate are checked and recorded at intervals of about 30 minutes until the termination of the operation.

The SCC was washed immediately after the operation is terminated. The washing is performed sufficiently to the extent that no residual smell is left particularly in the system from the second condenser to the second condensate-discharge pump.

Examples 1–3

Molasses (manufactured by Sansho, Brix: 75) was used as raw materials 1 and 2 and molasses (manufactured by Sansho, differing from the raw materials 1 and 2 in lot, Brix: 75) was used as a raw material 3.

Figure 2:
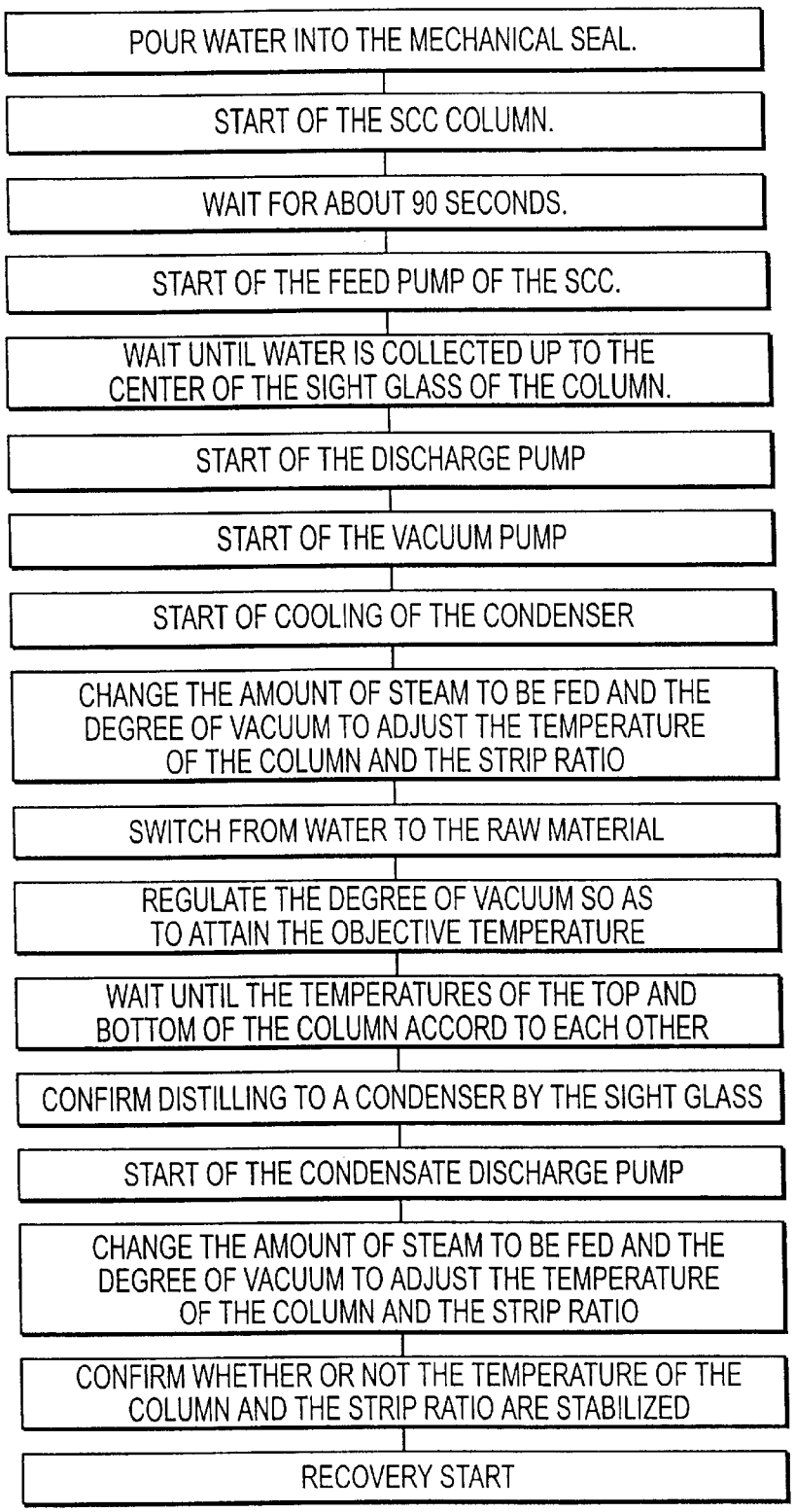
FIG. 2 is an explanatory view showing a flow of the start of an operation until the start of recovery by an spinning cone column (SCC)
Figure 3:
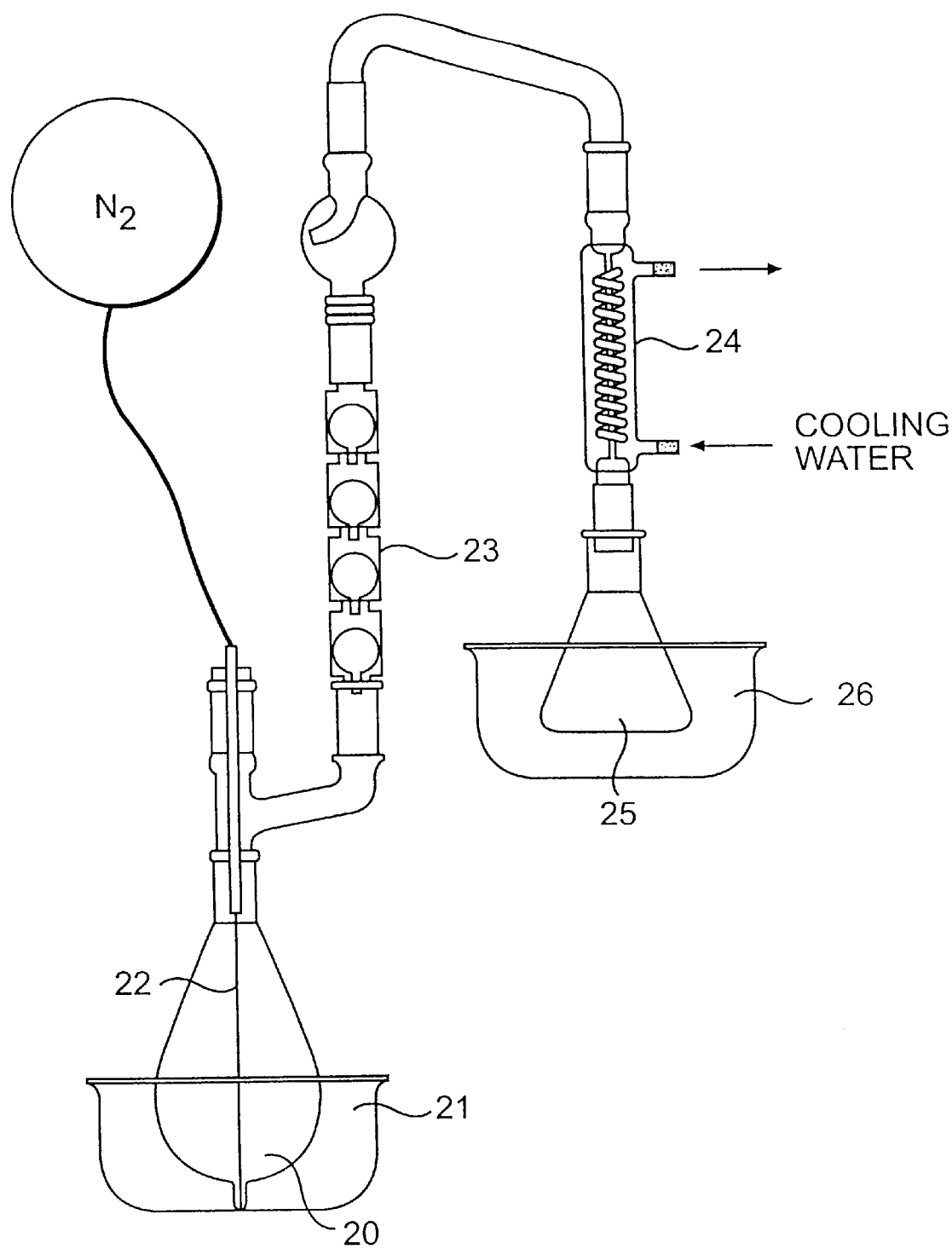
FIG. 3 is a schematic view showing a KD (Kuderna Danish) concentrator.

According to the aforementioned process flow of FIG. 2, the SCC feed tank was charged with 800 kg of ion exchange water and in succession, 400 kg of molasses, which has been heated, was added with stirring to be dissolved. After the molasses was dissolved, 12 kg of ethanol was added and dissolved in the solution. The resulting solution was fed to the SCC at a feed rate of 500 l/h and at strip rates of about 2.5%, 5% and 2.5% for the raw materials 1, 2 and 3 respectively at a column temperature of 40 to 60° C. Thus a flavor component was recovered in about 2.5 hours. Each amount of the flavor components recovered from the raw materials 1, 2 and 3 were 27 kg, 55 kg and 27.5 kg respectively. The properties of each of the resulting components were as follows. In the table, the specific gravity is a value of $d_{20}^{20}$ and the refractive index is a value of $n_D^{20}$. The operations using the raw materials 1, 2 and 3 are shown by Examples 1, 2 and 3.

|  | Amount of flavorous components | Alcohol content | Specific gravity | Refractive index | color |
|---|---|---|---|---|---|
| Example 1 | 45.5 ppm | 18% | 0.973 | 1.3448 | Non-color |
| Example 2 | 27.8 ppm | 15% | 0.975 | 1.3454 | Non-color |
| Example 3 | 48.3 ppm | 18% | 0.973 | 1.3449 | Non-color |

Comparative 1

Acetone Extraction 205 g of acetone was added to 100 g of molasses (the same as in the above example) to carry out extraction. The mixture was cooled and allowed to stand all night and was then subjected to a separatory operation. The upper layer was concentrated under normal pressure at 60° C. The concentrated extract was further cooled and allowed to stand all night. Thereafter, suspended solids in the upper part were removed and the lower part was filtered using a filtering adjuvant and the filtrate was concentrated under reduced pressure to distill acetone. The concentrated filtrate was adjusted to Brix 40 by using ion exchange water to obtain 137.5 g of a blackish brown viscous liquid extract. The properties, specific gravity and refractive index of the resulting sugar-like flavorous component were as shown below.

Properties: the amount of a flavorous component: 659.6 ppm

Specific gravity: 1.137 to 1.153

Refractive index: 1.395 to 1.403

Comparative Examples 2 and 3

SCC Process (Non Alcohol is Added)

According to the same process flow as in the aforementioned Example 1, 800 kg of ion exchange water was added in a feed tank. In succession, 400 kg of molasses was raised in temperature and poured into the feed tank with stirring to be dissolved. The dissolved molasses was fed to the SCC column at a flow rate of 500 l/h at a strip rate of 2.5% (Comparative Example 2) and 5% (Comparative Example 3) and a column temperature of 40 to 60° C. to obtain flavorous concentrates in amounts of 29 kg and 58 kg respectively in about 2.5 hours. The properties of the resulting sugar-like flavorous component were as follows.

|  | Amount of flavorous components | Specific gravity | Refractive index | Alcohol content |
|---|---|---|---|---|
| Comparative Example 2 | 106.3 ppm | 0.987 | 1.3376 | 0 |
| Comparative Example 3 | 67.6 ppm | 0.989 | 1.3369 | 0 |

Functional Test Example 1

The sugar-like flavorous components obtained in Examples 1 to 3 and Comparative Examples 1 to 3 were respectively applied to blotter to compare the intensity of the flavor (flavorous intensity), flavorous tone and color by 10 trained panelists (years of experience: 4 to 15 years, men and women five each). The results are shown below.

|  | Flavorous intensity | Color | Flavorous tone |
|---|---|---|---|
| Example 1 | 2,000 times | Colorless and transparent | Highly refined sugar-like |
| Example 2 | 1,500 times | Colorless and transparent | Unrefined sugar-like |
| Example 3 | 2,000 times | Colorless and transparent | Highly refined sugar-like |
| Comparative Example 1 | 1,200 times | Brown and transparent | Flavor heavier and deeper than that of the above examples |
| Comparative Example 2 | 1,600 times | Colorless and transparent | Weaker in top note than the above examples |
| Comparative Example 3 | 1,200 times | Colorless and transparent | Weaker in top note than the above examples |

Test Example 2

A difference in the content of the component of the resulting extract was measured using gas chromatography. The analysis method is the same as the method described above.

The contents of flavor components classified by functional groups in the extract obtained using an internal standard are shown in the following table.

| Classification according to functional groups | Example 1 | Example 2 | Example 3 | Comparative Example 1 | Comparative Example 2 |
|---|---|---|---|---|---|
|  | Contents of flavor components | | | | |
|  | 45.5 ppm | 27.8 ppm | 48.3 ppm | 659.6 ppm | 106.3 ppm |
| Alcohol | 28.05 | 15.269 | 32.383 | 36.843 | 76.696 |
| Ester | 2.676 | 1.981 | 2.740 | — | 4.475 |
| Terpene | 1.825 | 1.467 | 1.341 | — | 1.588 |
| Furan | 1.064 | 0.587 | 1.024 | 1.319 | 0.512 |
| Lactone | 0.287 | 0.371 | 0.018 | 4.202 | 0.388 |
| Nitrogen compound | 0.109 | 0.124 | 0.077 | 15.921 | 0.287 |
| Aldehyde | 0.107 | 0.070 | 0.251 | 15.697 | 0.300 |
| Phenol | 0.026 | 0.076 | 0.028 | 14.041 | 0.101 |
| Acid | 0.065 | 0.070 | 0.078 | 275.616 | 0.134 |
| Others | 11.281 | 7.784 | 10.362 | 297.281 | 21.819 |

Each content of major flavorous components confirmed from the area of the peak of a gas chromatogram in the extract is shown in the following table.

|  | Compounds showing a peak | Example 1 | Example 2 | Example 3 | Comparative Example 1 | Comparative Example 2 |
|---|---|---|---|---|---|---|
| 1 | 2-methyl-3-butene-2-ol | — | — | — | 0.430 | — |
| 2 | Hexanol | — | — | — | 0.354 | — |
| 3 | Isobutanol | 2.533 | 1.004 | 3.177 | — | 8.139 |
| 4 | Isoamyl acetate | 0.158 | 0.074 | 0.343 | — | 0.719 |
| 5 | 4-methyl-3-pentene-2-ol | — | — | — | 4.818 | — |
| 6 | Butanol | 0.132 | 0.071 | 0.176 | — | 0.072 |
| 7 | Limonene | 0.038 | 0.040 | 0.115 | — | 0.075 |
| 8 | Isoamyl alcohol | 23.934 | 13.405 | 27.639 | 0.243 | 64.226 |
| 9 | Ethyl caproate | 0.114 | 0.059 | 0.193 | — | 0.330 |
| 10 | Amyl alcohol | 0.098 | 0.050 | 0.111 | — | 0.090 |
| 11 | 2,3,5,6-tetramethyl-1,4-dioxane-2,5-diol | — | — | — | 1.654 | — |
| 12 | Octanal | 0.107 | 0.070 | 0.251 | — | 0.300 |
| 13 | Acetol | — | — | — | 0.588 | — |
| 14 | Isoamyl isovalerianate | 1.000 | 1.000 | 1.000 | 1.000 | 1.000 |
| 15 | Isohexanol | 0.174 | 0.107 | 0.172 | — | 0.401 |
| 16 | 2-heptanol | 0.201 | 0.124 | 0.195 | — | 0.510 |
| 17 | 3-methylpentanol | 0.207 | 0.124 | 0.251 | — | 0.323 |
| 18 | Hexanol | 0.299 | 0.169 | 0.303 | — | 0.475 |
| 19 | 2-methyl-4-oxopentane-2-ol | — | — | — | 9.731 | — |
| 20 | 2-octanol | 0.081 | 0.049 | 0.075 | — | 0.188 |
| 21 | Ethyl caprylate | 0.255 | 0.151 | 0.388 | — | 0.481 |
| 22 | Acetic acid | — | — | — | 157.935 | — |
| 23 | Furfural | — | — | — | 3.316 | — |
| 24 | Heptanol | 0.121 | 0.079 | 0.121 | — | 0.248 |
| 25 | 2-ethylhexanol | 0.176 | 0.029 | 0.057 | — | 0.192 |
| 26 | 2-acetylfuran | — | — | — | 1.319 | — |
| 27 | Propionic acid | — | — | — | 9.457 | — |
| 28 | Ethyl nonanoate | 0.096 | 0.062 | 0.141 | — | 0.134 |
| 29 | Octanol | 0.101 | 0.057 | 0.104 | — | 0.247 |

-continued

| | Compounds showing a peak | Example 1 | Example 2 | Example 3 | Comparative Example 1 | Comparative Example 2 |
|---|---|---|---|---|---|---|
| 30 | 5-methylfurfural | — | — | — | 1.729 | — |
| 31 | Butyric acid | — | — | — | 8.486 | — |
| 32 | Ethyl caprate | 0.137 | 0.135 | 0.257 | — | 0.329 |
| 33 | Furfuryl alcohol | — | — | — | 7.846 | — |
| 34 | Ethyl benzoate | 0.360 | 0.169 | 0.305 | — | 0.572 |
| 35 | Isovaleric acid | — | — | — | 3.790 | — |
| 36 | δ-hexalactone | — | — | — | 0.138 | — |
| 37 | 5-methylfurfuryl alcohol | 0.646 | 0.398 | 0.693 | — | 0.539 |
| 38 | Decanol | — | — | — | 1.342 | — |
| 39 | Phenylethyl acetate | 1.335 | 1.089 | 0.867 | — | 0.957 |
| 40 | cyclotene | — | — | — | 3.083 | — |
| 41 | β-damascenone | 1.030 | 0.590 | 0.545 | — | 0.796 |
| 42 | Ethyl laurate | 0.192 | 0.166 | 0.205 | — | 0.772 |
| 43 | Phenylethyl alcohol | 0.341 | 0.419 | 0.329 | 10.192 | 1.046 |
| 44 | 2-acetylpyrrole | 0.109 | 0.124 | 0.077 | 15.921 | 0.287 |
| 45 | Pantolactone | — | — | — | 3.727 | — |
| 46 | Caprylic acid | 0.065 | 0.070 | 0.078 | 0.720 | 0.183 |
| 47 | γ-nonalactone | — | — | — | 0.337 | — |
| 48 | Megastigmatrienone-1 | 0.069 | 0.061 | 0.050 | — | 0.102 |
| 49 | 4-ethylphenol | 0.026 | 0.076 | 0.028 | — | 0.101 |
| 50 | Decane-1,5-olide | 0.287 | 0.371 | 0.018 | — | 0.388 |
| 51 | Megastigmatrienone-2 | 0.208 | 0.216 | 0.018 | — | 0.380 |
| 52 | 2,6-dimethoxyphenol | — | — | — | 5.745 | — |
| 53 | Ethyl palmitate | 0.029 | 0.076 | 0.041 | — | 0.181 |
| 54 | Megastigmatrienone-3 | 0.140 | 0.141 | 0.122 | — | 0.235 |
| 55 | Benzoic acid | — | — | — | 78.127 | — |
| 56 | 5-hydroxymethyl-2-furfural | — | — | — | 10.299 | — |
| 57 | Phenylacetic acid | — | — | — | 17.102 | — |
| 58 | Acetovanillone | — | — | — | 8.296 | — |

The data of Comparative Example 3 is omitted since it is the same as that of Comparative 2 (SCC treatment, non-alcohol, SR: 2.5%).

Comparing Example 3 (alcohol is added) with Comparative Example 2 (no alcohol is added) in the ratio of components, the total amount of flavors is larger in Comparative Example 2 (no alcohol is added). It seems that there is no large difference when these flavors are classified by functional groups. However, comparing each component in the flavor balance, the proportion of the amount of components including β-damascenone, octanal, phenylethyl acetate, amyl alcohol, ethyl caprylate, ethyl nonanate and ethyl caprate to the total amount of flavors is larger in Example 3. Each threshold value of, particularly, β-damascenone, octanal and phenylethyl acetate is low, which is supposed to contribute to the sugar-like flavor.

Example 4

Using the molasses flavor (sugar-like flavor component) obtained in Example 1, a rum flavor was prepared according to the following formulation.

| Formulation of a rum flavor | % by weight |
|---|---|
| Rum ether | 20.0 |
| Vanillin | 3.0 |
| Molasses flavor | 20.0 |
| Rum extract | 30.0 |
| Ethyl propionate | 1.0 |
| Ethyl acetate | 2.0 |
| Ethanol | 20.0 |
| Fusel oil | 4.0 |
| Total | 100.0 |

Example 5

Using the molasses flavor (sugar-like flavor component) obtained in Example 2, a tea beverage (non-sugar) was prepared according to the following formulation. Formulation of a tea beverage (non-sugar) % by weight

| Tea extract (Brix: 0.25) | 99.9 |
|---|---|
| Molasses flavor | 0.1 |
| Total | 100.0 |

Functional Test Example 2

Examples 4 and 5 and examples (controls 1 and 2) using ion exchange water in place of the molasses flavor in these Examples 4 and 5 were compared by the same specialty panelists as above.

Flavor tone, Comparison and characteristics

Example 4 This has the individual sweetness of rum and produces a better mild rum flavor.

Controls This seems to have a fermented odor accompanied by an ester odor, specifically, a chemical odor without the individual sweetness of rum.

Example 5 The tea has a faintly sweet flavor and a taste relieved of a unique astringent taste. A sugar-like flavor is left after retort disinfection.

Controls This has a more astringent taste than Example 5 and seems to have a strong disinfect odor.

From the foregoing results, it is understood that the composition of the present invention can impart a natural flavor and mellowness to compound products and beverages and is largely different from conventional flavorous compositions.

What is claimed is:

1. A method of the preparation of a sugar-like flavorous component, the method comprising steps of;

adding 1.5 to 3 parts by weight of ion exchange water and 0.02 to 0.05 parts by weight of ethanol to 1 part by weight of molasses in a feed tank;

mixing and dissolving these components thoroughly with stirring; and introducing the resulting solution into a spinning cone column (SCC) to treat the solution in the following condition: the temperature in a column: 40 to 60° C., strip rate: 0.5 to 7% and the degree of pressure reduction: 70 to 100 kPa.

2. A method of the preparation of a sugar-like flavorous component according to claim 1, wherein the strip rate is 0.5 to 3% and the sugar-like flavor is highly refined sugar-like flavor.

3. A method of the preparation of a sugar-like flavorous component according to claim 1, wherein the strip rate is 3 to 7% and the sugar-like flavor is unrefined sugar-like flavor.

4. A method of the preparation of a flavorous composition, the method comprising adding the sugar-like flavor component obtained by the method according to any one of claims 1 to 3 to a perfumery in an amount of 5 to 30% by weight.

5. A method of the preparation of a beverage, the method comprising adding the sugar-like flavor component obtained by the method according to any one of claims 1 to 3 to a beverage in an amount of 0.01 to 5% by weight.

* * * * *